Nov. 30, 1943.　　　H. P. RANSBURG　　　2,335,790
CONVEYER SYSTEM
Filed Jan. 17, 1941　　　2 Sheets-Sheet 1
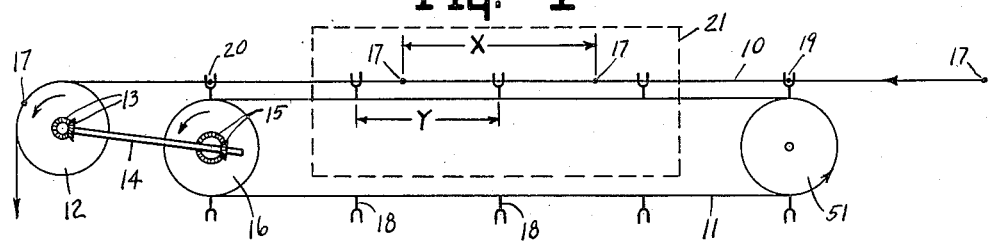
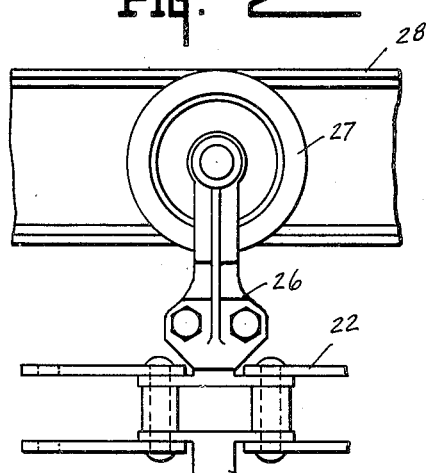
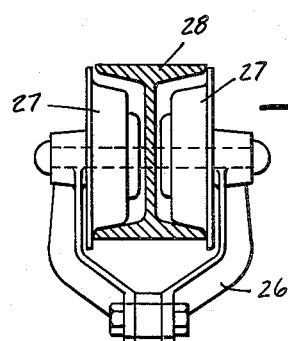
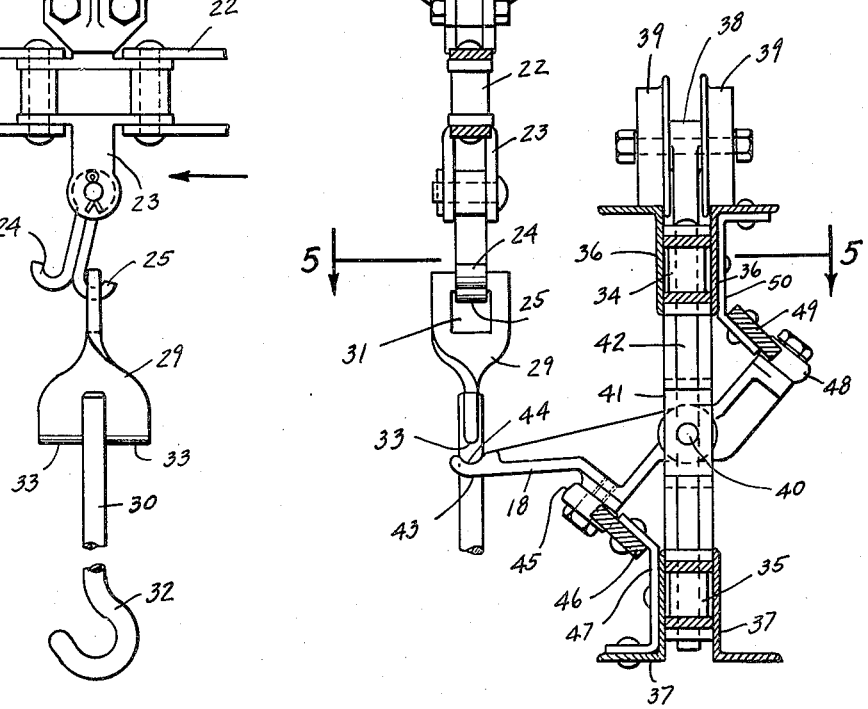
INVENTOR.
HAROLD P. RANSBURG.
BY Lockwood, Goldsmith & Galt,
ATTORNEYS.

Nov. 30, 1943.  H. P. RANSBURG  2,335,790
CONVEYER SYSTEM
Filed Jan. 17, 1941  2 Sheets-Sheet 2
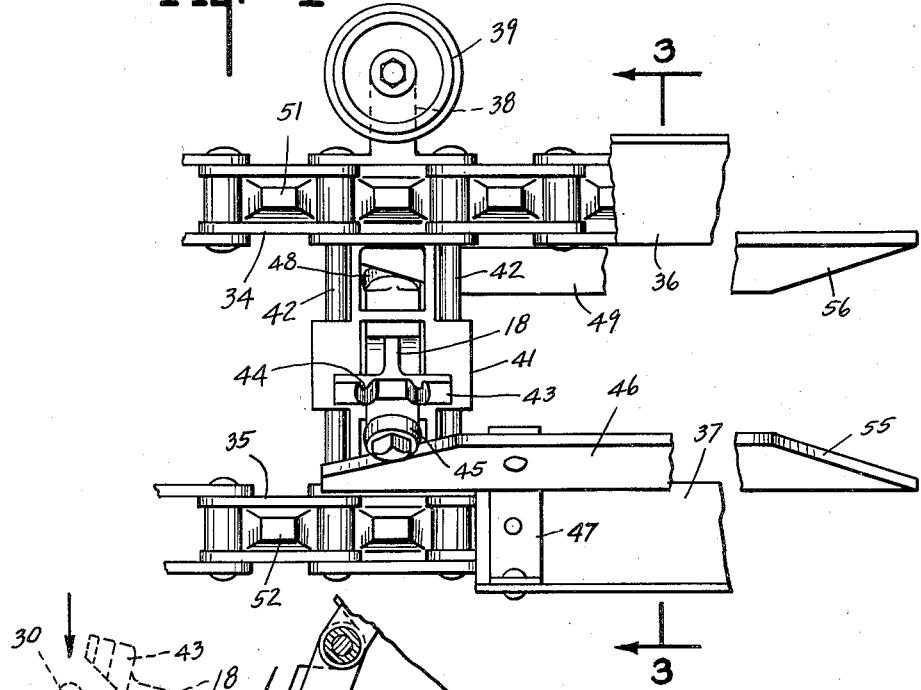
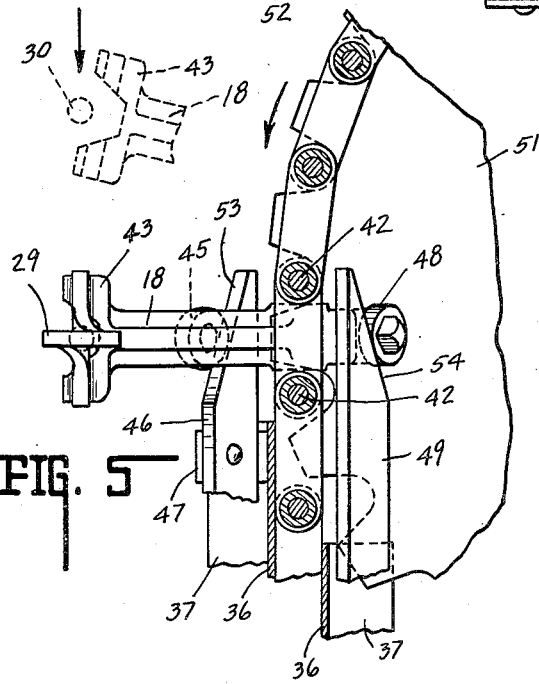
INVENTOR.
HAROLD P. RANSBURG.
BY Lockwood, Goldsmith & Galt,
ATTORNEYS.

Patented Nov. 30, 1943

2,335,790

UNITED STATES PATENT OFFICE 2,335,790

CONVEYER SYSTEM

Harold P. Ransburg, Indianapolis, Ind., assignor to Harper J. Ransburg, doing business as Harper J. Ransburg Company, Indianapolis, Ind.

Application January 17, 1941, Serial No. 374,873

12 Claims. (Cl. 198—177)

This invention relates to a conveyer system adapted for moving articles in a manufacturing or processing plant. The invention is particularly applicable to the movement of articles successively through a series of positions in which different operations are performed thereon such as cleaning, spray painting, hand painting, baking or the like.

It is a common practice in manufacturing and processing plants in which a succession of articles are similarly treated, to convey said articles through the several processing stations on continuous conveyers. Ordinarily the spacing of articles on the conveyers is uniform and the speed of movement of the entire system is necessarily uniform. In many cases, however, it is desirable that the articles be more closely spaced and moved correspondingly slower at some stations than at others. For example, in a baking oven, for hardening an enamel coating, it is desirable that the articles move slowly and be as closely spaced as possible in order to conserve floor space. At other points in the process of applying the paint or enamel and particularly in the travel of the article between processing stations, it is desirable that the articles be more widely spaced and move faster.

One object of the present invention is to provide a conveyer system in which the speed and spacing of the articles may be conveniently varied at different points in their travel. This object is accomplished by the use of auxiliary conveyers approaching the path of travel of a main conveyer at suitable transfer points and the provision of automatic means for transferring articles from one conveyer to the other at said transfer points. The auxiliary conveyers may be moved at slower or faster speeds than the principal conveyer and the operation of the conveyers may be accurately timed to provide the desired spacing of the articles on each conveyer.

Another object of the invention is to provide improved means for transferring articles from one conveyer to another. This object is accomplished by the provision of uniformly spaced hangers on each conveyer so arranged that each of the faster moving hangers passes a slower moving hanger at the transfer point. One set of hangers is made relatively movable with respect to its conveyer and is automatically moved at the transfer point to lift the articles or article carriers from the hangers on the other conveyer or to place said articles on said last mentioned hangers.

Another feature of the invention which contributes to the last mentioned object is the fact that the hangers on one conveyer may be made to overhang the path of travel of the conveyer proper and said conveyer may approach the transfer point in a curved path. When this construction is applied to the slower moving conveyer and the hangers overhang the conveyer path on the convex side of the curve, said hangers naturally approach the transfer point at a greater linear speed than that of the conveyer on which they are carried. The proportions may be so arranged that the speed of approach of said hangers is equal to or at least comparable with the speed of movement of the faster conveyer. Thus, at the transfer point, the hangers on the two conveyers may be made to move at substantially the same speed and transfer of the articles or article carriers is greatly facilitated.

Other objects and features of the invention will be understood from the accompanying drawings and the following description and claims:

Fig. 1 is a plan view diagrammatic in character showing the paths of a main conveyer and an auxiliary conveyer and illustrating the spacing of article carriers thereon for one embodiment of the invention. Fig. 2 is a side elevational view of a preferred form of main conveyer and attachments used thereon for carrying articles. Fig. 3 is an elevational cross sectional view through the main and auxiliary conveyers and is taken substantially on the line 3—3 of Fig. 4. Fig. 4 is a side elevational view of the auxiliary conveyer and attachments carried thereby. Fig. 5 is a sectional plan view taken on the line 5—5 of Fig. 3.

Referring now particularly to Fig. 1, there are diagrammatically illustrated therein the path of travel 10 of a main conveyer and the path 11 of an auxiliary conveyer. The main conveyer may be power driven from an electric motor or any other suitable source of power and is assumed to move in the direction of the arrows in Fig. 1. Said conveyer is trained about a sprocket 12 which is connected by a pair of beveled gears 13, a shaft 14 and a pair of beveled gears 15 to a sprocket 16 which drives the auxiliary conveyer in the path 11. Thus the auxiliary conveyer is driven in accurately timed relation with the movement of the main conveyer and the relative speed may be chosen as desired by suitable choice of the size of sprockets 12 and 16 and gears 13 and 15. The main conveyer carries a plurality of hangers, the position of which is indicated by dots 17. Said hangers are uniformly spaced at a distance apart indicated by the dimension X. The auxiliary conveyer carries uniformly spaced hangers 18 and the spacing of said hangers is indicated by the dimension Y. The dimensions X and Y are directly proportional to the speeds of their respective conveyers and in the illustrated case, since X is greater than Y, the main conveyer is made to travel in the path 10 at a correspondingly faster speed than the travel of the auxiliary conveyer in the path 11. When this relation has been established it is apparent that there will be one or more definite points at which each of the faster moving hangers overtakes and passes one of the slower moving hangers. One such point is indicated at 19 and another at 20. At these points the paths of travel of the two conveyers are closely adjacent and said points are used as transfer points for transfer of the merchandise from one conveyer to another.

Between the transfer points 19 and 20 there is outlined in broken lines 21 the position of a processing zone which may contain bake oven, a paint spray booth or any other suitable piece of apparatus through which the articles are to be moved relatively slowly and with correspondingly closer spacing. In the drawing both conveyers are shown as passing through said processing zone. It is only necessary, however, that the conveyer which actually carries the articles through this part of the travel should pass through said zone. The other conveyer may follow any suitable path between the transfer points.

Referring now to Fig. 2, there is shown therein a preferred form of the main conveyer. Said conveyer consists of a sprocket chain 22 which may be arranged to follow the path 10 of Fig. 1. At each of the points indicated 17 in Fig. 1 there is provided on the chain 22 a hanger attachment 23 and said attachment has pivotally mounted thereon a pair of hooks 24 and 25. The hook 24 faces forwardly with reference to the direction of movement of the chain 22 indicated by the arrow in Fig. 2 and the hook 25 faces rearwardly with reference to said direction. Above each of the hanger attachments 23 there is provided a yoke attachment 26 secured to the chain 22 and carrying a pair of trolley wheels 27 adapted to run on the lower flange of an I-beam support 28. The I-beam 28 may be suitably supported in any desired manner and serves to carry the weight of the chain 22 and the merchandise supported thereby.

Figs. 2 and 3 also indicate a preferred form of merchandise carrier consisting of a fitting 29 and a downwardly extending rod 30 secured thereto preferably by welding. The upper portion of the fitting 29 is provided with an opening 31 which may be engaged by the hooks 24 or 25 for carrying the same. The lower end of the rod 30 terminates in a hook 32 on which the merchandise may be hung. The lower portion of the fitting 29 is provided with a pair of horizontal shoulders 33 extending parallel with the direction of movement of the chain 22.

The auxiliary conveyer moving in the path 11 of Fig. 1 consists of a pair of sprocket chains 34 and 35, best seen in Figs. 3 and 4. Said sprocket chains are arranged one above the other and in the straight portions of the path 11 are confined between angle irons 36 for the upper chain and angle irons 37 for the lower chain 35. At suitable intervals the upper chain 34 is provided with attachments 38 carrying flanged wheels 39 running on the upper surface of the angle irons 36 and supporting the weight of the chains 34 and 35 and associated parts. The hangers 18 shown diagrammatically in Fig. 1 are shown more in detail in Figs. 3, 4 and 5. Said hangers are pivotally mounted at 40 on fittings 41 secured to vertical rods 42 which at their upper and lower ends form the pivot pins of corresponding links of the chain 34 and 35. Each of the hangers 18 has a bifurcated outwardly extending portion 43 which overhangs the path of travel of the conveyer proper and is provided with a groove 44 adapted to engage the undersurface of the shoulders 33. A roller 45 is mounted on each of the hangers 18 and is adapted to engage a cam track 46 mounted by means of suitable brackets 47 on one of the angle irons 37. A similar roller 48 is mounted on a rearwardly extending portion of each of the hangers 18 and engages a similar cam track 49 supported by brackets 50 on one of the angle irons 36. During the portion of the travel of chain 34 approaching the transfer point 19 said chain is engaged by a sprocket 51 and the chain 35 is engaged by a similar sprocket 52. Said sprockets are suitably mounted for rotation about a vertical axis.

In the operation of the apparatus just described, the merchandise carriers 29—30 normally approach the transfer point 19 while carried by the hooks 25 on the conveyer chain 22 moving in the path 10. The hangers 18 approach the transfer point while moving in the curved path about the sprockets 51 and 52. Since said hangers overhang the path 11 on the convex side of the curvature of said path, they move at a faster rate of speed than that of the chains 34 and 35 moving in the path 11. The amount of overhang may be so chosen that the linear speed of movement of the hangers 18 is substantially the same as that of the hangers 23 on the faster moving conveyer. Thus the bifurcated end 43 of each of said hangers as it approaches the transfer point 19 may straddle the rod 30 of one of the merchandise carriers and a relatively small clearance is necessary.

Just before the transfer point 19 is reached, the rollers 45 and 48 engage inclined portions 53 and 54 of the cam tracks 46 and 49 respectively. This engagement causes the hanger 18 to be moved about its pivotal mounting 40 and brings the groove 44 into engagement with the shoulders 33. The extent of said movement is sufficient to lift the merchandise carrier from the hook 25. As the transfer point 19 is passed, the carrier 18 is slowed to the speed of the chains 34 and 35 and the faster moving hanger 23 carries the hook 25 away from the merchandise carrier. The carrier and the article supported thereby have thus been transferred to the slower moving conveyer and move through the processing zone with a slower speed and closer spacing.

At the transfer point 20 the operations just described are reversed. The faster moving hanger 23 overtakes one of the slower moving hangers 18. The forwardly facing hook 24 engages the opening 31 in the merchandise carrier and soon thereafter the rollers 45 and 48 reach inclined portions 55 and 56 of the cam tracks 46 and 49. The hanger 18 is thus permitted to move downwardly by gravity to deposit the merchandise carrier on the hook 24. The high speed travel of the articles is thus resumed.

The invention has been described in one of its preferred forms. Details of course may be varied to suit various conditions without departing from the scope of the invention as defined by the appended claims. For example, it will not be necessary in every case to remove the article from a main conveyer and return the same to the same conveyer. It is not necessary that the movable hangers be carried on the slow moving conveyer, although this arrangement is advantageous in many cases. It is not necessary that the linear speed of the hangers approaching the transfer point 19 be exactly the same as the linear speed of the hangers 23 since considerable clearance may be provided in the bifurcated ends 43 and since the pivotal mounting of the hooks 24 and 25 permits considerable tolerance in the adjustment. Certain articles of merchandise may be so shaped as to be hung directly on the hangers, making the carriers 29 unnecessary. For that reason the phrase "merchandise carriers" as used in the claims may be taken to include any article so shaped. Other variations will be apparent to those skilled in the art to which the invention pertains.

The invention claimed is:

1. A conveyer system including a pair of conveyers movable in paths closely adjacent each other at a transfer point, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at the transfer point and the hangers on one of said conveyers being movably mounted thereon, merchandise carriers adapted to be carried by said hangers, and mechanism adapted to move said movably mounted hangers upwardly with respect to their carrying conveyer at the transfer point to engage the merchandise carriers carried by the hangers on the other conveyer and to lift the same therefrom.

2. A conveyer system including a pair of conveyers movable in paths closely adjacent each other at a transfer point, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at the transfer point and the hangers on one of said conveyers being movably mounted thereon, merchandise carriers adapted to be carried by said hangers, and mechanism adapted to move said movably mounted hangers downwardly with respect to their carrying conveyer at the transfer point to deposit merchandise carriers carried thereby onto the hangers on the other conveyer.

3. A conveyer system including a pair of conveyers movable in paths closely adjacent each other at two different transfer points, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at each transfer point and the hangers on one of said conveyers being movably mounted thereon, merchandise carriers adapted to be carried by said hangers, and mechanism adapted to move said movably mounted hangers upwardly with respect to their carrying conveyer at one transfer point and downwardly at the other to engage the merchandise carriers carried by the hangers on the other conveyer and lift the same therefrom in said upward movement and to deposit said carriers on said last mentioned hangers in said downward movement.

4. A conveyer system including a pair of conveyers movable in paths closely adjacent each other at two different transfer points, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at each transfer point, the faster moving hangers each including a forwardly facing hook and a rearwardly facing hook, merchandise carriers adapted to hang on said hooks and to be engaged and carried by the slower moving hangers, said carriers normally hanging on the rearwardly facing hooks as they approach the first of said transfer points, and mechanism adapted to move the slower moving hangers upwardly at the first transfer point and downwardly at the second, to lift said carriers from the rearwardly facing hooks in said upward movement and to deposit the same on said forwardly facing hooks in said downward movement.

5. A conveyer system including a pair of conveyers movable in paths closely adjacent each other at a transfer point, means for driving said conveyers in definitely timed relation, one of said conveyers moving at a slower speed than the others, uniformly spaced hangers carried by each conveyer, the spacing of said hangers being directly proportional to the speed of their respective conveyers and said hangers being so placed thereon that each of the faster moving hangers passes one of the slower moving hangers at the transfer point, the faster moving hangers including rearwardly facing hooks and the slower moving hangers being movably mounted on their carrying conveyer, merchandise carriers adapted to hang on said hooks and to be engaged and carried by the slower moving hangers, said carriers normally hanging on said hooks as they approach said transfer point, and mechanism adapted to move the slower moving hangers upwardly with respect to their carrying conveyer at said transfer point to engage said carriers and remove the same from said hooks.

6. A conveyer system including a pair of conveyers movable in paths closely adjacent each other at a transfer point, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at the transfer point, the hangers on one of said conveyers being pivotally mounted on said conveyer for movement about substantially horizontal axes, merchandise carriers adapted to be carried by said hangers, and means engaging said pivotally mounted hangers and adapted to move the same about their pivotal mountings at the transfer point to transfer said carriers from the hangers on one conveyer to those on the other.

7. A conveyer system including a pair of conveyers movable in paths closely adjacent each other at a transfer point, means for driving said conveyers in definitely timed relation, one of said conveyers moving at a slower speed than the other, uniformly spaced hangers carried by each conveyer, the spacing of said hangers being directly proportional to the speed of their respective conveyers and said hangers being so placed thereon that each of the faster moving hangers passes one of the slower moving hangers at the transfer point, the slower moving conveyer approaching the transfer point in a curved path and the hangers thereon extending radially outward from said conveyer to swing about the center of curvature of said path, whereby they approach the transfer point at a greater linear speed than their supporting conveyer comparable to that of the faster moving conveyer, merchandise carriers adapted to be carried by said hangers, and mechanism at the transfer point adapted to transfer said carriers from the hangers on one conveyer to those on the other.

8. A conveyer system including a main conveyer and an auxiliary conveyer movable in paths closely adjacent each other at two different transfer points, means for driving said conveyers in definitely timed relation, uniformly spaced hangers carried by each conveyer so placed thereon that the hangers of one conveyer meet those of the other conveyer at said transfer points, the hangers on said main conveyer including a forwardly facing hook and a rearwardly facing hook, merchandise adapted to normally hang on the rearwardly facing hooks as they approach the first of said transfer points, and mechanism adapted to move the hangers on the auxiliary conveyer upwardly at the first transfer point and downwardly at the second to lift said carriers from the rearwardly facing hooks in said upward movement and to deposit the same on said forwardly facing hooks in the downward movement.

9. A conveyer system including a main conveyer, a plurality of merchandise supporting hangers secured thereto, means for driving said main conveyer, an auxiliary conveyer movable in the same direction and in paths closely adjacent to said main conveyer at two spaced transfer stations, sprocket drives for said auxiliary conveyer positioned at said transfer stations, means for driving said sprockets and auxiliary conveyer at a slower speed than said main conveyer, and merchandise supporting hangers secured to said auxiliary conveyer, the spacing of said hangers being directly proportional to the speed of their respective conveyers and the auxiliary conveyer hangers projecting radially outwardly therefrom to swing about the center of said sprocket drive in an arc of greater radius at substantially the greater speed of said main conveyer.

10. A conveyer system including a main conveyer, a plurality of merchandise supporting hangers secured thereto, means for driving said main conveyer, an auxiliary conveyer movable in the same direction and in paths closely adjacent to said main conveyer at two spaced transfer stations, sprocket drives for said auxiliary conveyer positioned at said transfer stations, means for driving said sprockets and auxiliary conveyer at a slower speed than said main conveyer, merchandise supporting hangers secured to said auxiliary conveyer, the spacing of said hangers being directly proportional to the speed of their respective conveyers and the auxiliary conveyer hangers projecting radially outwardly therefrom to swing about the center of said sprocket drive in an arc of greater radius at substantially the greater speed of said main conveyer, and means associated with each of said sprockets for raising and lowering the outer ends of said auxiliary conveyer hangers as they move adjacent the main conveyer hangers to remove the merchandise therefrom at the first station and replace it thereon at the other station.

11. A conveyer system including a main conveyer having a plurality of spaced merchandise hangers thereon, an auxiliary conveyer having a plurality of spaced merchandise hangers thereon, means for driving said conveyers for movement throughout a portion of their travel in parallel spaced relation including closely adjacent spaced merchandise transfer stations, the main conveyer being driven at a greater speed than the auxiliary conveyer and the hangers on said main conveyer being in greater spaced relation than the hangers on said auxiliary conveyer proportionally to their respective rates of travel, said spacing of the hangers and the relative speed of travel being such that the hangers on the respective conveyers will be brought into juxtaposition at each transfer station while the hangers on the main conveyer move at greater speed than the hangers on the auxiliary conveyer intermediate said stations, and means associated with one of said conveyers for effecting transfer of merchandise from one hanger to the other at said stations.

12. A conveyer system including a main conveyer traveling in a horizontal path, an auxiliary conveyer travelling in a horizontal path parallel with and adjacent said main conveyer throughout a portion of its travel, means for synchronously driving said conveyers, the auxiliary conveyer being driven at a slower speed than the main conveyer, a series of merchandise supporting hangers carried by each conveyer and spaced on their respective conveyers proportionate to their relative speeds, the distance of travel of the auxiliary conveyer in parallel relation with the main conveyer being such that their respective hangers will be brought into juxtaposition at two spaced transfer stations, means associated with said auxiliary conveyer at the first of said stations operable by the movement thereof to transfer merchandise from the main conveyer hanger to the adjacent auxiliary conveyer hanger for processing while conveyed thereby at a slower speed at less spaced intervals, and means associated with said auxiliary conveyer at the second transfer station operable by the movement thereof to effect the transfer of the merchandise from the auxiliary conveyer hanger to the adjacent main conveyer hanger for permitting the merchandise to be more rapidly conveyed after said processing.

HAROLD P. RANSBURG.